United States Patent [19]
Anthon

[11] 3,770,355
[45] Nov. 6, 1973

[54] THICK WINDOW TRANSMISSION SPECTROPHOTOMETER AND METHOD
[75] Inventor: Erik W. Anthon, Santa Rosa, Calif.
[73] Assignee: Optical Coating Laboratory, Inc., Santa Rosa, Calif.
[22] Filed: May 31, 1972
[21] Appl. No.: 258,318

[52] U.S. Cl............ 356/189, 250/83.3 H, 356/96, 356/186, 356/201, 356/205
[51] Int. Cl. ...... G01j 3/48, G01j 3/42, G01n 21/22
[58] Field of Search ................ 356/51, 96, 97, 173, 356/179, 186, 188, 189, 201, 204, 205, 206; 250/88.3 H

[56] References Cited
UNITED STATES PATENTS
3,628,872  12/1971  Miranda............................ 356/201

Primary Examiner—Ronald L. Wibert
Assistant Examiner—V. P. McGraw
Attorney—Paul D. Flehr et al.

[57] ABSTRACT

A spectrophotometer for ascertaining transmission of enery by a test piece and having a housing with a source of energy in the housing and means carried by the housing for forming an image limiting aperture. Optical means within the housing is provided for receiving energy from the source for forming a beam of energy and imaging the source in the aperture. Means is provided for chopping the beam. Filter means is provided for passing selected narrow spectral bands of energy in the beam. Optical means is provided for receiving energy passing through the aperture and includes collimating means and means for causing the beam to be tilted at an angle with respect to the test piece. Means including a detector is provided for receiving the beam after it has passed through the test piece.

In the method, a beam of energy is provided which is collimated and is offset at an angle with respect to the test piece so that back reflected energy is substantially eliminated and will not influence the tests being made on the test piece. Tests are made with and without the test piece in the beam.

27 Claims, 9 Drawing Figures

THICK WINDOW TRANSMISSION SPECTROPHOTOMETER AND METHOD

BACKGROUND OF THE INVENTION

This invention relates to spectrophotometers and more particularly to spectrophotometers which can be utilized for measuring the transmission of thick windows.

Spectrophotometers have heretofore been provided. However, it has been found that such spectrophotometers are not satisfactory for measuring large thick windows. For example, the shear size and bulk of such windows makes it impossible to properly position them in the sample compartment of any conventional spectrophotometer. Additional problems are created in measuring characteristics of windows having high indices of refraction as, for example, germanium windows. The optical path in a conventional spectrophotometer will be appreciably changed when a thick piece of material such as germanium is placed in the beam. With such thick windows, it is not possible to establish a reliable reference reading from which accurate transmission measurements can be derived unless the optical path changes are accurately compensated for. It has been found that the high index of refraction of germanium also causes a high percentage of energy to be reflected back. It is necessary to account for the reflected energy and to ensure than none of this back reflected energy gets redirected into the beam in a direction which would cause erroneous high transmission readings. The reflection problem is particularly severe with uncoated germanium, but is of little consequence with the coated germanium parts since the coating is designed to reduce the reflection to a very minimal value. There is a need to measure the transmission of uncoated germanium to avoid coating substrates having excessive internal absorbence and also to evaluate the performance of a coating. There is, therefore, a need for a new and improved spectrophotometer which is particularly useful in measuring thick windows and particularly windows of germanium.

SUMMARY OF THE INVENTION AND OBJECTS

The spectrophotometer for testing a relatively thick piece consists of a housing. A source of energy in the form of a glower is disposed within the housing. Means is provided within the housing which forms an image limiting aperture. Optical means is provided within the housing for receiving energy from the source and forming a beam and imaging the source in the aperture. Means is provided for chopping the beam and filter means is provided for passing only selected narrow spectral bands of the energy in the beam. Additional optical means is provided for receiving energy passing through the aperture and includes collimating means and means for tilting the beam so that it passes at an angle through the test piece. Means is provided for receiving the beam after it passes through the test piece and provides an electrical signal which has an amplitude proportional to the received energy and a frequency controlled by the frequency of the chopper.

In the method, the tests are made with the test piece out of the beam and with the test piece in the beam. Tests are run at several different locations in the thick window.

In general, it is an object of the present invention to provide a spectrophotometer and method which can be used for making transmission measurements on thick windows.

Another object of the invention is to provide a spectrophotometer and method of the above character which can be used for measuring the transmission of thick windows of various thicknesses.

Another object of the invention is to provide a spectrophotometer and method of the above character which can be used for measuring the transmission of thick germanium windows.

Another object of the invention is to provide a spectrophotometer and method of the above character in which the beam of energy before passing through the test piece is collimated and is tilted at an angle with respect to the test piece.

Another object of the invention is to provide a spectrophotometer and method of the above character in which there is substantially no attenuation of multiple forward reflectances.

Another object of the invention is to provide a spectrophotometer and method of the above character in which the limiting aperture is positioned so that the multiple reflectances which are displaced in the aperture are replaced by multiple reflectances which otherwise would have missed the limiting aperture.

Another object of the invention is to provide a spectrophotometer and method of the above character in which the aperture is over-filled.

Additional features and objects of the invention will appear from the following description in which the preferred embodiment is set forth in detail in conjunction with the accompanying drawing.

DESCRIPTION OF PREFERRED EMBODIMENT

Figure 9:
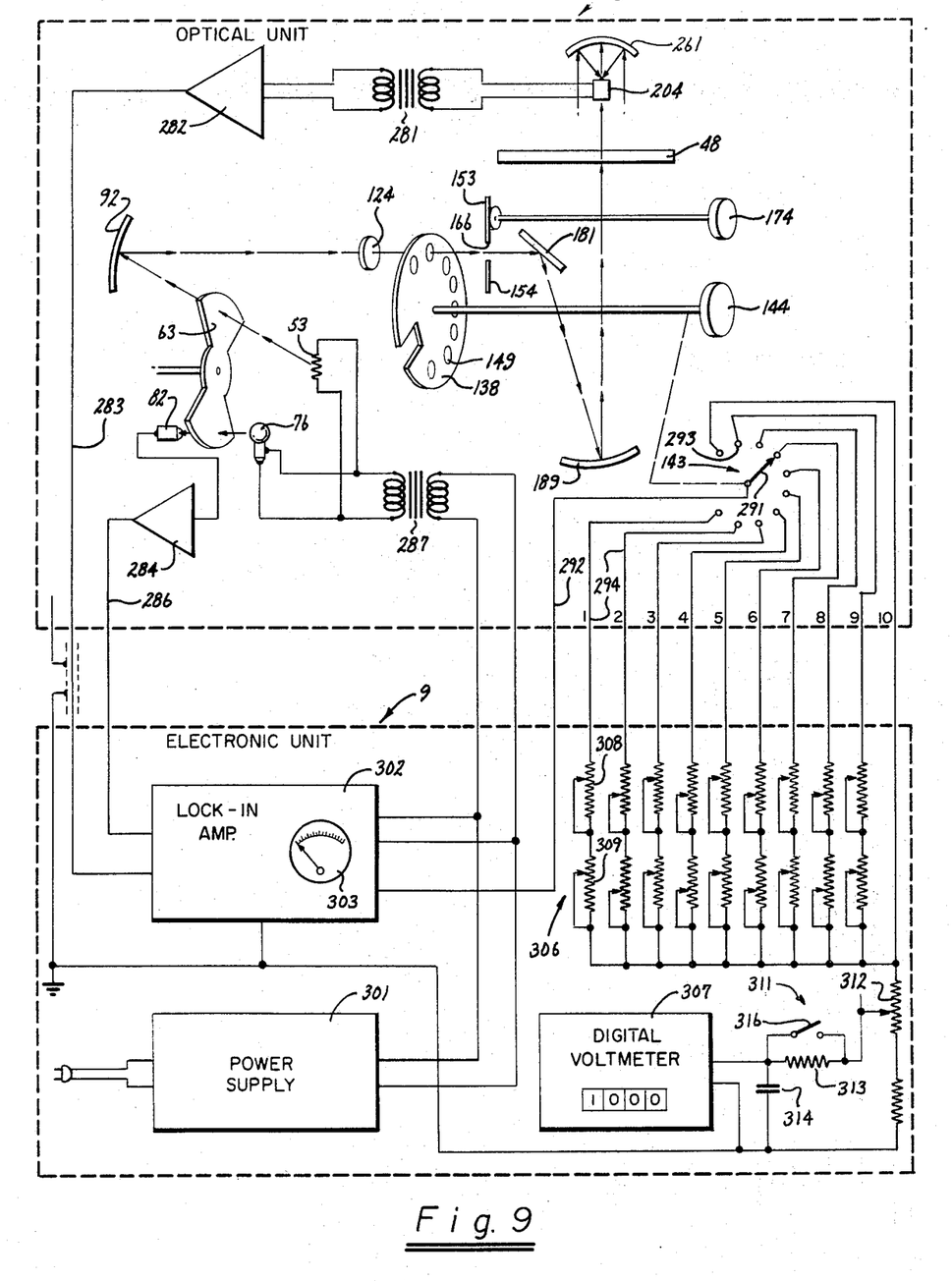
FIG. 9 is a circuit diagram partially in block diagram form and showing certain of the parts of the spectrophotometer schematically for the spectrophotometer.

As shown in the drawings, the thick window transmission spectrophotometer incorporating the present invention consists of an optical unit 8 and an electronic unit 9 (see FIG. 9). The optical unit 8 consists of a rectangular case or housing 11 which is provided with spaced parallel vertical front and rear walls 12 and 13 and spaced parallel vertical side walls 14 and 16 adjoining the front and rear walls 12 and 13. Thus, it can be seen that the case 11 has a rectangular configuration and has an open top side upon which there is mounted a top plate 17 which generally lies in horizontal plane.

The top plate 17 is secured to the front and rear walls 12 and 13 and the side walls 14 and 16 by suitable means such as screws 18. The case is also provided with a bottom wall 19 which is also secured to the front and rear walls 12 and 13 and the side walls 14 and 16 by suitable means such as screws 21.

The case 11 is also provided with an interior wall 22 which is secured to the top plate 17 and the bottom plate 19 by screws 23. An additional wall 24 is secured to the wall 14 and the wall 22 as shown.

A carriage 26 is mounted on the case 11 for travel in a horizontal plane relative to the top wall 17 of the case. The carriage 26 consists of a flat generally rectangular plate 27 formed of a suitable material such as aluminum. Three half bearings 28 of a conventional type are secured to the bottom of the plate 27 by suitable means such as screws 29. Two of the half bearings are provided on one side of the plate and the other of the half bearings is provided on the other side of the plate. The half bearings slidably engage cylindrical rods 31 which are disposed in spaced parallel V-shaped grooves formed and extending longitudinally of the top plate 17. The rods 31 are retained in the grooves 32 by screws 33 extending upwardly through the back side of the top plate 17 (see FIG. 5).

Means is provided for shifting the carriage longitudinally of the rods 31 which serve as ways. Such means consists of a rack 36 which is formed integral with two of the half bearings 38 disposed on one side of the plate 27. The rack 36 is engaged by pinion 37 which is pinned to a shaft 38. The shaft 38 is rotatably mounted in bushings 39 and 41 which are seated in sleeves 42 and 43. A retaining ring 44 is mounted on the shaft 38 for retaining the shaft within the bushings 39 and 41. A hand wheel 46 is pinned to the other end of the shaft 38 and is provided with a handle 50 which is adapted to be gripped by a hand to permit rotation of the shaft 38 and the pinion carried thereby to cause the rack 36 and the plate 27 mounted thereon to be shifted longitudinally of the top plate 17.

The carriage is provided with a plurality of support pads 47 formed of a suitable material such as Teflon. The support pads 47 are provided with vertically aligned cylindrical portions 47a and 47b extending in opposite directions. The portions 47b are adapted to fit into holes (not shown) provided in the carriage plate 27. The top cylindrical portions 47a are adapted to be engaged by the test piece in the form of a thick window 48 positioned thereon and of which measurements are to be made. As can be seen, the support pads 47 are distributed over the plate 27 so that they will provide adequate support for the test piece in a plurality of positions as, for example, the two positions shown in which one position is shown in broken lines.

The carriage plate 27 is provided with an elongate opening 49 extending longitudinally of the same substantially equi-distant between the sides to permit energy to pass through the plate and to strike the window 48 in the manner hereinafter described.

Figure 3:
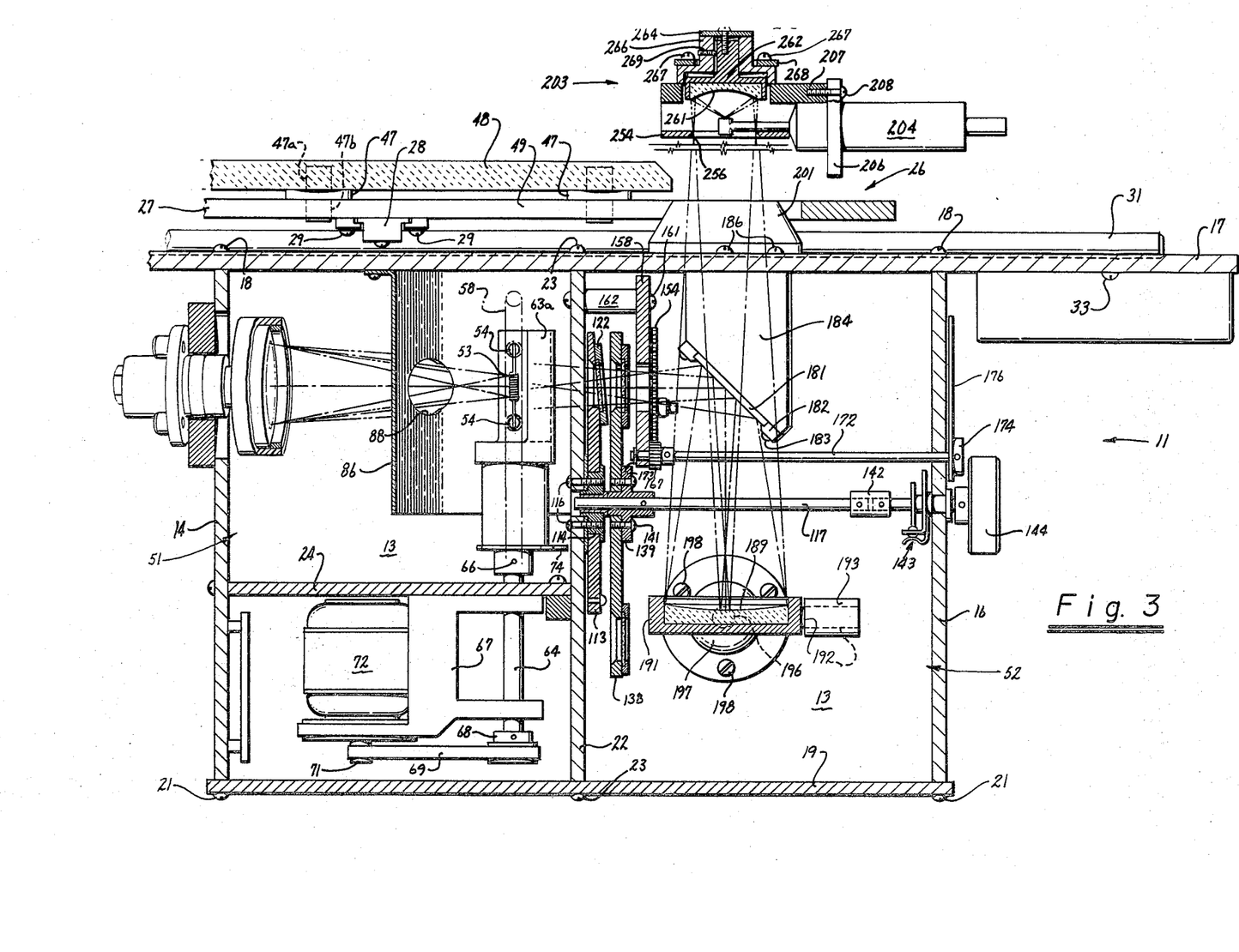
FIG. 3 is an enlarged cross-sectional view of the spectrophotometer shown in FIGS. 1 and 2.

The wall 22 serves to divide the interior of the case 11 into first and second compartments 51 and 52 and serves to prevent any substantial energy transfer from one compartment to the other. A source of energy is provided in the first compartment 51 in the form of a glower 53 formed of a suitable material such as Nichrome wire. The wire is coiled as shown in FIG. 3. The ends of the glower 53 are secured to electrical contact elements in a suitable form such as brass screws 54 which have the ends of the glower soldered thereto. Thumb nuts 55 are threaded onto the screws 54 for connecting electrical wires 56 to the screws 54 for supplying power to the glower. The screws 54 are mounted in a porcelain support member 57 which is secured to an L-shaped post 58 that is mounted on a bracket 59 secured by screws 61 to the divider plate 24.

Figure 4:
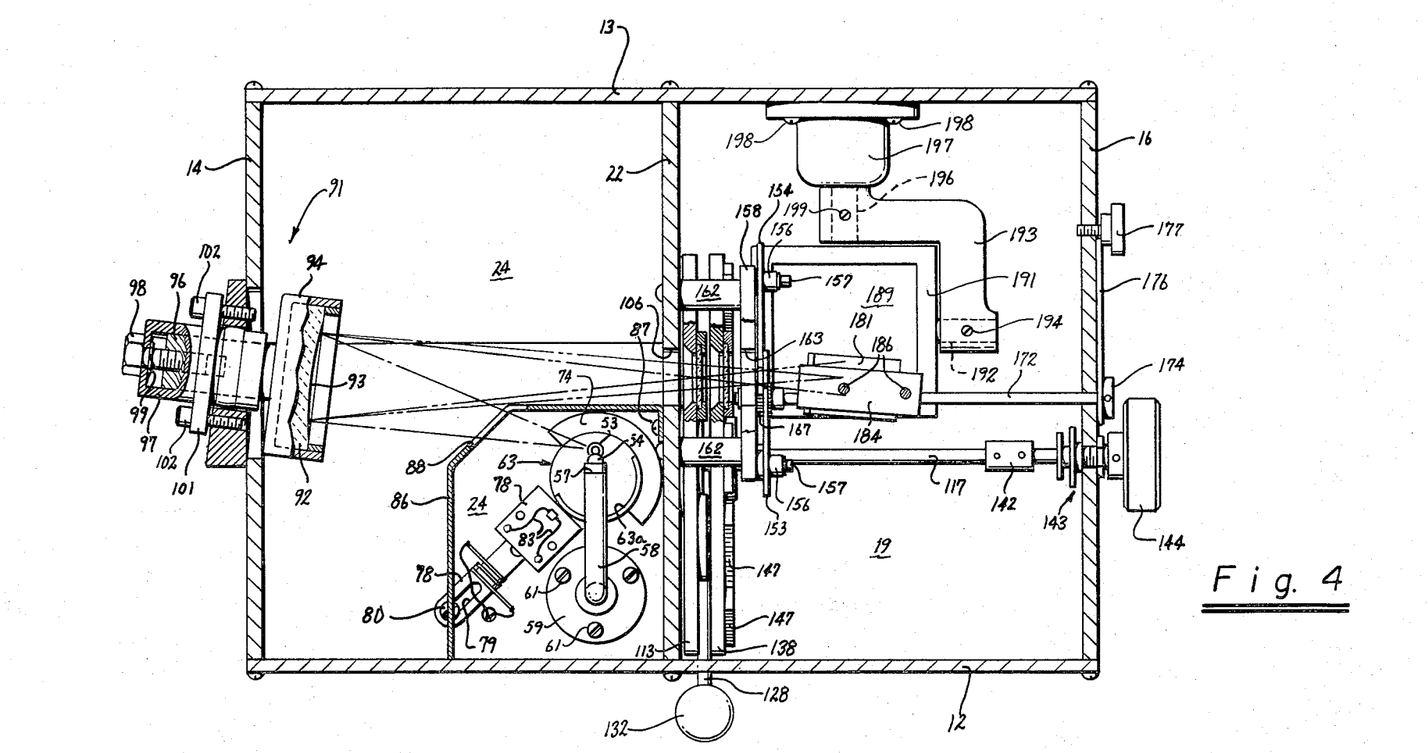
FIG. 4 is an enlarged cross-sectional view of the spectrophotometer shown in FIGS. 1 and 2.

The glower 53 provides a source of infra-red energy which is chopped by a chopper assembly 62. The chopper assembly 62 consists of a chopper 63 which is generally cylindrical in shape. The upper half has been formed as a half cylinder as shown particularly in FIG. 4 which extends through approximately 180° and which is adapted to rotate about the glower 53 as shown in FIG. 4. Thus, the chopper 63 is provided with an upper semi-circular portion 63a as shown in FIG. 4. The chopper 63 is secured to a shaft 64 by a pin 66. The shaft 64 extends through the plate 24 and through a bracket 67 secured to the plate 24. A pulley 68 is keyed to the shaft 64 and is driven by a belt 69. The belt 69 is driven by a pulley 71 which is driven by a motor 72 carried by the bracket 67. Thus, it can be seen there is provided a source of infra-red energy which is chopped at a predetermined frequency.

Means is provided which serves as a reference which is used for regulating the source. This reference consists of a separate semi-circular chopper blade 74 secured to chopper 63 by screws 75 which also subtends 180° but is 90° out of phase with the semi-circular portion 63a of the chopper 63. The chopper blade 74 is adapted to interrupt an incandescent light beam supplied by a lamp 76 provided within a block 77 mounted upon a bracket 78 that is provided with an elongate slot 79 therein and through which a thumb screw 80 extends and which is utilized for securing the bracket 78 to the plate 24. A board 81 of insulating material is mounted upon the block 77 and has a hole (not shown) therein adapted to receive light rays from the lamp 76 provided within the block 77. Photosensitive means in the form of a photodiode 82 mounted in the block 77 overlying the hole is connected by wires 83 to appropriate circuitry as hereinafter described. As the shaft 64 is rotated, the chopper blade 74 periodically interrupts the passage of the beam from the incandescent lamp to the photosensitive diode 82.

The infra-red source and the reference hereinbefore described are mounted within a baffle 86 which has its bottom end open and which is secured to the top plate 17 by screws 87 so that it depends from the top plate. The baffle 86 is provided with a circular opening 88 through which the infra-red energy can pass as shown particularly in FIGS. 3 and 4. The baffle 86 serves to conduct air around the glower 53 to cool the same. The air passes upwardly through a chimney 89 (see FIG. 1) formed by a plate 90 secured to the front wall 12 of the case 11. In addition, it confines the infra-red energy being emitted by the glower 53.

Chopped infra-red energy passing through the hole 88 strikes a re-imaging mirror assembly 91. The re-imaging mirror assembly 91 consists of a mirror 92 which is provided with a convex spherical first reflecting surface 93. The mirror 92 is carried by a mount 94 which is generally dish-shaped. The mount 94 is provided with a cylindrical extension 96 which is slidably mounted in a cup-shaped member 97. A cap screw 98 is rotatably mounted in the cup-shaped member 97 and is retained therein by a retaining ring 99. The cap screw 98 is threaded into the extension 96 and is provided for adjusting the mirror inwardly and outwardly relative to the cup-shaped member 97. The cup-shaped member 97 is provided with a flange 101 which has three screws 102 extending therethrough and which are threaded into a wedge-shaped bracket 103 secured to the case 11. Thus, it can be seen that the screws 102 are utilized for shifting the angle of the mirror 92, whereas the screw 98 is utilized for adjusting the focus of the mirror.

The infra-red energy is reflected by the first surface reflector 93 through a hole 106 provided in the wall 22 so that the energy passes from the first chamber 51 into the second chamber 52. The energy in the second chamber first passes through a blocker assembly 108, then through a filter assembly 109 so that the source is focused in an adjustable aperture assembly 111.

The blocker assembly 108 consists of a segment-shaped member 113 which has a flanged hub 114 secured thereto by suitable means such as screws 116. The hub 114 is rotatably mounted upon a shaft 117. The shaft 117 is mounted within the case 11 as hereinafter described. The segment-shaped member 113 is provided with three different openings 118, 119 and 121 which are spaced radially by equal distances from the shaft 117. Two of the holes 118 and 119 are covered by blocker holders 122 secured to the segment-shaped member 113 by screws 123. Filters 124 and 126 are provided in the holders 122 with the filter 124 being in the opening 118 and the filter 126 being in the opening 121.

For one application of the present invention, it was found desirable to provide the filter 124 so that it would block energy from 2 to 7 microns and filter 126 would block energy from 15 to 25 microns. The filters 124 and 126 are mounted in such a manner so they can be removed and checked to determine whether they are functioning properly. The central opening 119 is clear.

The segment-shaped member 113 is provided with an arm 127. An operating rod 128 is pivotally connected thereto by a pin 129. The rod 128 extends through a hole 131 provided in the front wall 12. A knob 132 is threaded on the outer end of the rod 128 and is provided for moving the segment-shaped member 113 into three different positions. In the position shown in FIG. 7, the operating rod is in its innermost position with the segment-shaped member engaging a pin 133 mounted on the wall 22. In this position, the blocking filter 126 is in line with the beam of energy passing through the hole 106. To bring the clear opening 119 into registration with the beam, the operating rod is pulled outwardly until the inner notch 134 is in registration with the wall 12. With the operating rod 128 in its outermost position, the blocking filter 124 is moved into the path of the beam passing through the opening or hole 106.

The blocker assembly is mounted on the shaft 117 in such a manner that it is tilted or inclined at an angle (see FIG. 3) with respect to the axis of the beam of energy passing through the hole 106, ranging from 4° to 10°, i.e. 5°. This ensures that energy reflected by a filter in the blocker will be rejected out of the beam and will not enter the beam which is transmitted forward.

The filter assembly 109 consists of a circular filter wheel or member 138. A flanged hub 139 is secured to the filter wheel or member 138 by screws 141. The hub 139 is secured to the shaft 117. One end of the shaft 117 is rotatably mounted upon the wall 22 by suitable bearing means (not shown). The other end of the shaft is connected by a coupling 142 to a conventional indexing switch 143. The indexing switch 143 is mounted in the wall 16 and is adapted to be operated by a knob 144. The rotary switch 143 is such that by use of the knob 144, the wheel or member 138 can be rotated to different selected positions. The wheel or member 138 is provided with nine openings 146 spaced equal distances from the shaft 117 near the outer margin of the wheel 138. Holders 147 are removably secured to the wheel 138 by screws 148. Filters 149 are carried by the holders. The filters 149 have the desired characteristics as hereinafter described. Filter wheel 138 is provided with a cut-out 151 to permit access to the blocker assembly.

Figure 8:
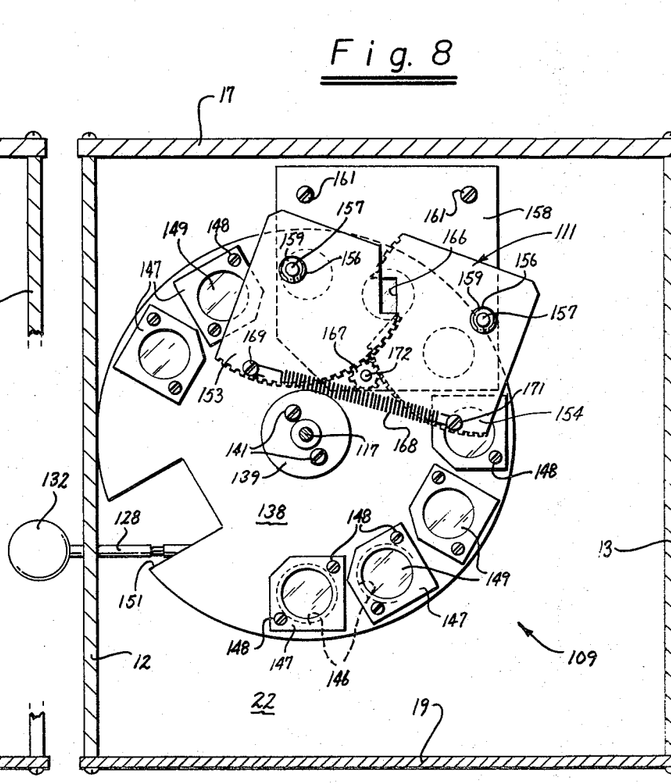
FIG. 8 is an enlarged cross-sectional view of the filter assembly.

The aperture assembly 111 consists of two gear segments 153 and 154. The gear segments 153 and 154 are mounted upon bushings 156 which are pivotally mounted upon pins 157 mounted in a plate 158. The bushings 156 are retained on the pins 157 by snap rings 159. The plate 158 is secured by screws 161 to posts 162 mounted on the wall 22. The plate 158 is provided with a circular opening 163 of approximately the same size as the openings 146 in the filter wheel 138. As can be seen particularly from FIG. 8, the gear segments 153 and 154 are provided with surfaces which are adapted to form a rectangular aperture 166. The gear segments 153 and 154 are engaged by a pinion 167 so that the size of the aperture 166 can be increased or decreased. As the size of the aperture is increased or decreased, it will remain generally rectangular although it may become slightly skewed. A tension spring 168 has one end secured to a screw 169 secured to the segment 153 and has the other end secured to a screw 171 carried by the segment 154 to remove backlash by movement of the segments 153 and 154. The pinion 167 is mounted upon a shaft 172. The shaft 172 has one end extending through the plate 158 and retained therein by snap ring 173 (see FIG. 3). The other end of the shaft 172 extends through the wall 16 and has a knob 174 mounted thereon. A segment 176 is mounted on the shaft 172 and is utilized for indicating the positions of the gear segments 153 and 154. Means is provided for locking the segment 176 in the desired position and consists of a thumb screw 177 which is threaded into the wall 16 and is adapted to engage the outer extremity of the segment 176.

As hereinafter described, the blocker assembly and the filter assembly 108 and 109 are utilized to adjust the amount of energy which is passing through the system and also to be sure to eliminate all stray energy. By way of example, the desirable part of the beam of energy may amount to less than one-half of 1 percent of the total beam energy available. It is for this reason that the blocker assembly may be necessary.

After the source has been focused in the aperture assembly 111, it passes to a first surface reflecting mirror 181 which can be termed a folding mirror which reflects the energy downwardly through 90°. The mirror is carried by a holder 182 which is secured by screws 183 to a triangular-shaped member 184. The member 184 extends downwardly from the top wall 17 and is secured to the top wall 17 by screws 186.

As the beam of energy is deflected downwardly by the folding mirror 181, the beam strikes a collimating mirror assembly 188. The collimating mirror assembly 188 consists of a first surface reflecting mirror 189 which is mounted in a cradle 191 which can be tilted in two directions. The cradle 191 is generally rectangular and is provided with a stub shaft 192 which is rotatably mounted in one end of an L-shaped arm 193. The shaft 192 is held in a predetermined angular position by set screw 194 threaded into the arm 193 and engaging the shaft 192. The arm 193 is rotatably mounted upon a shaft 196 carried by a bracket 197. The bracket 197 is secured to the rear wall 13 by screws 198. The arm 193 is held in the desired angular position on the shaft 196 by set screw 199.

After the beam of energy strikes the collimating mirror 189, it is reflected upwardly through the top plate 17 through the elongate opening 49 provided therein.

Figures 5, 6:
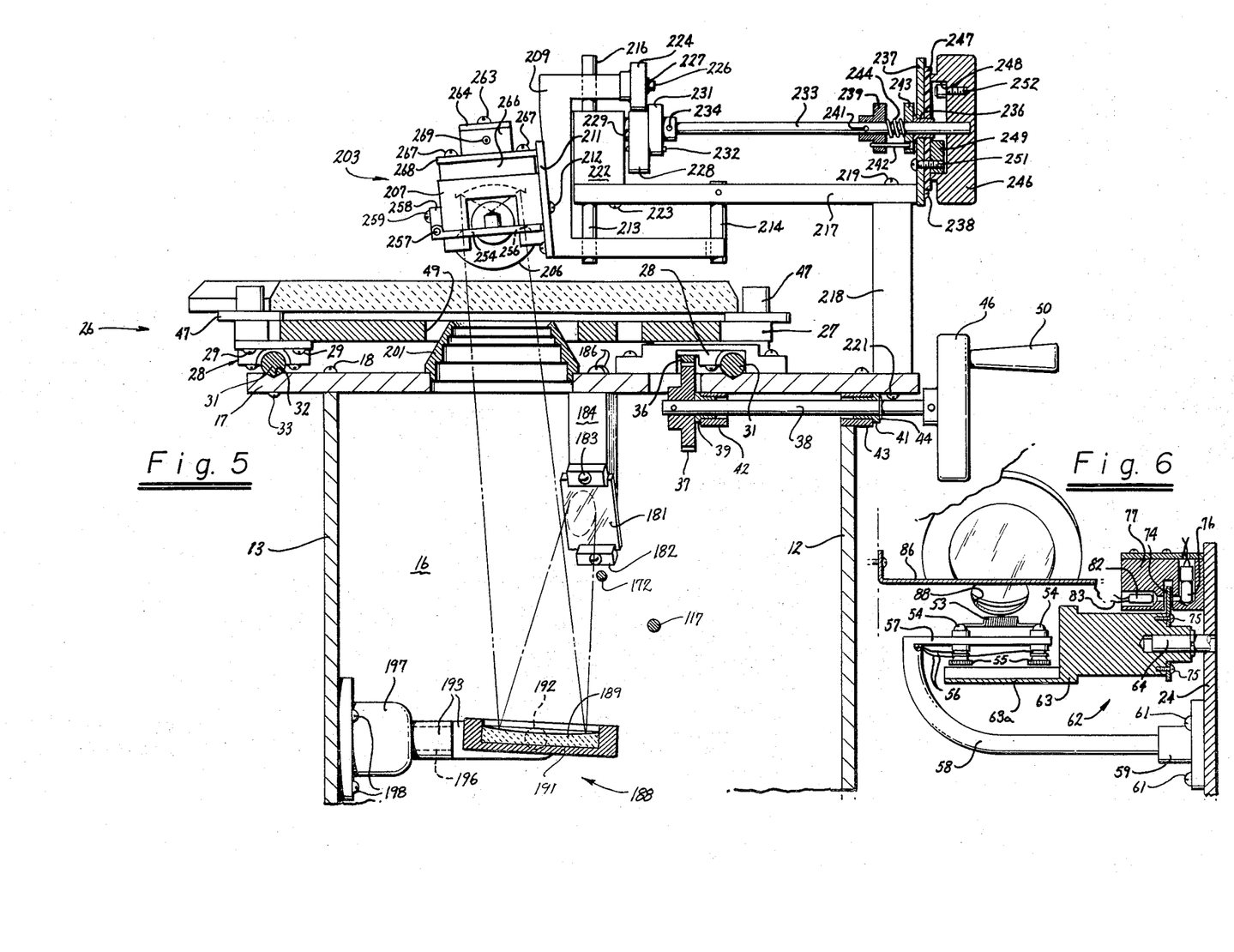
FIG. 5 is an enlarged cross-sectional view of the spectrophotometer shown in FIGS. 1 and 2.
FIG. 6 is an enlarged cross-sectional view of a portion of the spectrophotometer which includes the glower and the chopper.

A baffle 201 is mounted in the top plate 17 which has a stepped inner construction as shown particularly in FIG. 5 to prevent energy, i.e., stray energy, from sources other than the collimating mirror 189 from passing through the baffle. After passing through the baffle, the collimated beam passes through the elongate opening 49 provided in the plate 27 of the carriage 26. The light then passes through the test piece or window 48 (see FIG. 1) and is then detected by a detector assembly 203.

The detector assembly 203 consists of a vacuum thermocouple detector of a suitable type such as manufactured by Reeder. The Reeder vacuum thermocouple detector 204 is provided with a flange 206 which is secured to a U-shaped mounting block 207 by a screw 208. The mounting block 207 is secured to a U-shaped frame 209 by a plate 211 which is secured to the U-shaped frame 209 and to the block 207 by screws 212. The U-shaped frame 209 is adapted to travel vertically on first, second and third guide rods 213, 214 and 216, respectively. The guide rods 213 and 214 are mounted upon a detector assembly plate 217 that is secured to a post 218 by screws 219. The posts 218 are secured to the top plate 17 by screws 221. A mounting block 222 is secured to the plate 217 by screws 223. The third guide rod 216 is mounted in the post 222. A cam follower 224 is rotatably mounted on the upper end of the U-shaped frame 209 by a shaft 226 mounted in the U-shaped frame 209. The cam follower or roller 224 is retained on the shaft 226 by retaining ring 227. The cam follower engages an eccentric 228 which is rotatably mounted off-center on a shaft 229 mounted in the block 222. The eccentric 228 is secured to and is rotated by a hub 231 through a pin connection 232. The hub 231 is secured to a shaft 233 by a pin 234. The shaft 233 is rotatably mounted in a bushing 236. The bushing 236 is carried by a plate 237 secured to the plate 217 by screws 238. A hub 239 is secured by a pin 241 intermediate the ends of the shaft 233. A pin 242 is carried by the hub 239 and extends into a thrust washer 243 mounted on the shaft. A compression spring 244 is mounted on the shaft 233 between the hub 239 and the thrust washer 243.

The shaft 233 is adapted to be rotated by a hand-operated knob 246 which is utilized for positioning the detector. The knob is adapted to engage a friction plate 247 formed of a suitable material such as a phenolic resin. The spring 244 serves to urge the knob 246 into engagement with the friction plate 247. a cylindrical recess is provided on the inner side of the knob 246. A block 249 is mounted within the recess 248 and is secured to the front panel 237 by a screw 251. The block 249 serves as a stop which is adapted to be engaged by a screw 252 threaded into the knob in the recess 248 so that the knob can be only rotated through one-half a turn. By rotation of the knob 246, the thermocouple detector 204 is moved vertically between two extreme positions as determined by the eccentric 228 to change the length of the optical path as hereinafter described.

Means is provided for forming a limiting aperture for the infra-red energy which is supplied to the thermocouple detector 204 and consists of a plate 254 that is provided with a limiting aperture 256. This plate 254 is hinged on a pin 257. The pin 257 is mounted in a block 258 secured by a screw 259 to the U-shaped mounting block 207. It should be pointed out that this limiting aperture 256 is the only element which cuts into the beam which has been formed. None of the other optical elements such as the collimating mirror, the folding mirror, the filters and the imaging mirror cut into the beam. They are all larger than the beam. The only other element that cuts into the beam other than this limiting aperture 256 is the adjustable aperture 166 where the glower image is formed. Thus, it can be seen there is no vignetting of the beam even if the beam is deflected slightly.

The detector assembly also includes a collecting mirror in the form of a concave first surface mirror 261 which is mounted in a holder 262. A screw 263 is threaded into the holder and is carried by a plate 264 which is mounted upon a carrier 266. The carrier 266 is adapted to be moved in X and Y directions and held in the desired position by screws 267 carried by a plate 268 having over-sized holes therein. A set screw 269 is provided in the carrier and also serves to position the holder 262 for the mirror.

As can be seen particularly from FIG. 3, the collecting mirror 261 forms an image of the adjustable aperture on the detector 204. The output from the detector 204 is supplied to a step-up transformer 281 whose output is supplied to a signal preamplifier 282 mounted on plate 17. The output of the amplifier 282 is supplied to an output line 283. The photosensitive diode 82 supplies its output to a reference amplifier 284 which supplies its output on line 286. A step-down transformer 287 is connected to the glower 53. The selector switch 143 connected to shaft 128 (see FIG. 3) is provided as a part of the optical unit 8 and includes a wiper 291 (see FIG. 9) connected to a lead 292 and which is adapted to engage a plurality of contacts 293 that are connected to leads 294, numbered 1–10. This generally completes the optical unit 8.

The leads of the optical unit are connected to the electronic unit 9 which includes a power supply 301 which is adapted to be connected to a suitable source of power such as 115 volts, 60 cycle a.c. The output of the power supply 301 is supplied to the step-down transformer 287 which supplies the glower 53 and the lamp 76. Power is also supplied by the power supply 301 to a lock-in amplifier 302. The lock-in amplifier 302 can be of a suitable type such as a Princeton Applied Research Model 7B–5. The lock-in amplifier 302 receives the output from the signal preamplifier 282 and synchronously demodulates it with the output of the reference amplifier 284 to provide a filtered d.c. output which is displayed on a meter 303 provided as a part of the lockin amplifier and which is supplied on its output to line 292. An attenuator network 306 is connected between the selector switch 289 and the digital voltmeter 307. The attenuator network 306 consists of a pair of serially connected adjustable trimming potentiometers 308, 309 for each of the ten positions of the selector switch 289. The trimming potentiometers, also called trim pots, are utilized to normalize the outputs from the different filters so that a reading of very close to 100 percent is automatically obtained for all the filters.

A read-out network 311 is provided which is connected to the output of the digital voltmeter 307 and consists of a potentiometer 312 for a fine setting of 100 percent. It also includes a resistor 313 and a capacitor 314 for minimizing or eliminating noise from the signal. A switch 316 is provided for bypassing the resistor 313 to increase the response time of the read-out network.

The digital voltmeter 307 is of a conventional type such as a Weston Model 1261 with a 3 ½ digit capacity (the half digit reads either nothing or one).

Operation and use of the spectrophotometer in performing the present method may now be briefly described as follows. Before placing the spectrophotometer in operation, certain operational checks should be carried out. The instrument is visually aligned with the opening 199 in the blocker assembly 108 in alignment with the beam. Digital read-out zero is checked by disconnecting the lead 317 from the amplifier 302. If the voltmeter 307 does not read zero, it should be adjusted so it will read zero when no signal is being supplied to the same.

As explained previously, the attenuation network is provided so that it is possible to obtain readings close to 100 percent regardless of the energy level available from the filter 149 being utilized. This is necessary because the energy level available at the detector 204 varies with the different filters 149 carried by the filter wheel 183. Each of the filters 149 is provided with a pair of trimming potentiometers 308 and 309 which are placed in the circuit by the selector switch 143 which is tied into the filter wheel 138 and moves with the filter wheel. The aperture segments 153 and 154 are adjusted by operation of the knob 174 to obtain an output reading on the meter 303 of the amplifier 302 of approximately 90 percent of full scale. When the filter that gives the highest reading is in the beam, the the filter that gives the highest reading is in the beam, the 100 percent adjust potentiometer 312 is then set at the center of its travel. The two trim pots 308 and 309 for the filter are then adjusted to obtain a read-out from the digital voltmeter 307 of 100 percent ± 1 percent. Two trim pots are provided for this adjustment because one of the trim pots is used for coarse adjust and the other is used for fine adjust.

Figure 7:
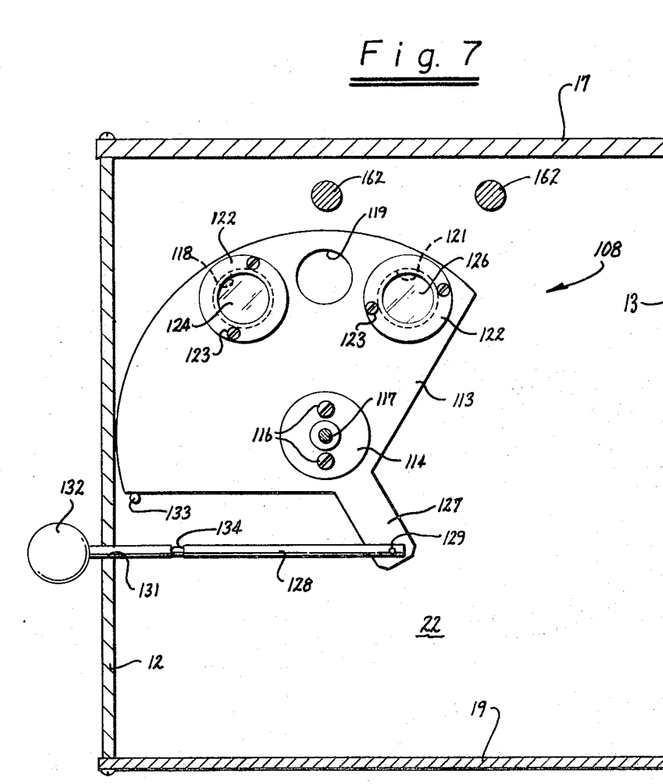
FIG. 7 is an enlarged cross-sectional view of the blocker assembly.

After these adjustments have been carried out, the spectrophotometer may be operated. The carriage 26 is placed in the extreme left position as viewed in FIG. 1. The support pads 47 are then checked to see that they are in the proper positions. The test part or window 48 is then placed on the pads on the carriage in the position shown in solid lines in FIG. 1. The blocker assembly 108 is positioned so that the blocking filter 124 is positioned so that the beam must pass through the same, i.e., the handle or knob 132 is "pushed in" as shown in FIG. 7. The detector is in its lowermost position. Potentiometer 312 is adjusted to obtain a reading of 100 percent. The detector position knob 246 is then rotated until the detector is in its uppermost position as shown in FIG. 3. The carriage 26 is then moved by the hand wheel 46 until the test piece or window 48 is in the beam. In other words, the beam must pass through the test part. The reading of the digital voltmeter 307 is then observed and recorded. Transmission can be measured at several points on the test piece in rapid sucession by moving the carriage by use of the hand wheel 46 to several positions and observing and recording the readings on the digital voltmeter 307. The carriage 26 is then again returned to the extreme left position and the same steps are repeated for each of the filters 149.

In making the measurements set forth above, it can be seen that the thermocouple detector 204 produces an alternating current signal with an amplitude proportional to the received energy and a frequency controlled by the rotating chopper 63. This signal is amplified in the step-up transformer 281 and the amplifier 282. The amplified alternating current is synchronously demodulated into a direct current by a phase-locked amplifier 302. The demodulated phase-lock signal is derived from a photodiode 82 which sees light from a small incandescent lamp 76 through the rotating chopper blade. Thus, the amplifier 302 only amplifies that part of the signal received from amplifier 242 which is synchronous with the reference signal from amplifier 284 to thereby remove substantially all noise in the signal from amplifier 282. The amplifier 302 supplies a direct current voltage proportional to the received energy on line 292 to the selector switch 289 through the selected trim pots of the attenuating network 306 through the potentiometer 312, the resistor 313, to the digital voltmeter 307.

Figure 1:
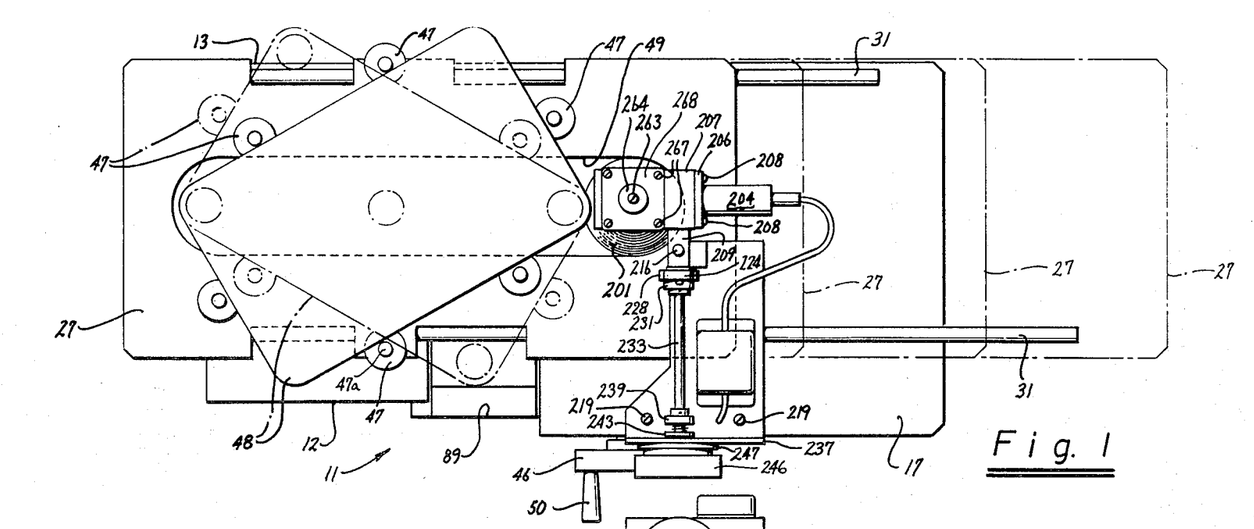
FIG. 1 is a top plan view of a spectrophotometer incorporating the present invention.
Figure 2:
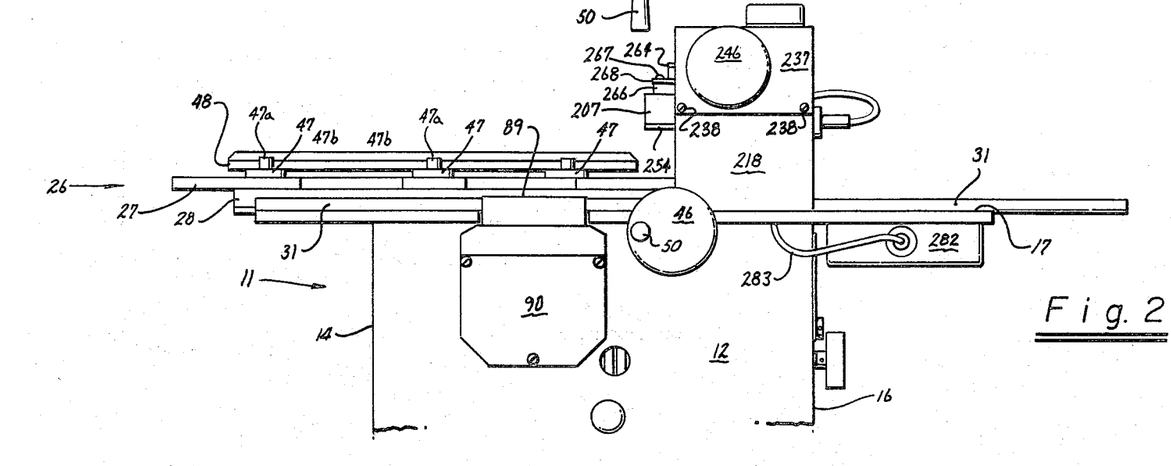
FIG. 2 is a side elevational view of the spectrophotometer shown in FIG. 1.

In making the measurements on the window 48, it may be desirable to shift the part to another position as shown in broken lines in FIG. 1.

The eccentric cam 228 has been provided, which is rotated by the knob or wheel 246, so that different thicknesses of parts 48 can be tested in the spectrophotometer. By way of example, test parts or pieces having a thickness of two inches can be checked by rotating the cam 228 to the two extreme positions. The cam has a 1 ½ inch throw. It can be readily appreciated that for checking parts having different thicknesses that different cams can be utilized by exchanging them with the cam 228.

From the foregoing it can be seen that before each measurement with a filter that the part 48 is out of the beam by moving the carriage to the extreme left position and adjustments are made so that a 100 percent reading is obtained with the detector 204 in its lowermost position and with no part in the beam. When the part is moved into the beam, the detector 204 is moved to its uppermost position and measurements are made in several areas spaced apart on the part.

It has been found that the spectrophotometer is particularly useful in making measurements on parts before they are coated and after they are coated. This is particularly desirable where the parts are rather expensive as, for example, with germanium windows. Checking the part before coating is very desirable because it is possible to ascertain whether there are any areas a low transmission in the part before coating. In addition, it is possible to tell whether or not a deficiency after the coating has been completed is attributable to the coating or to the part.

The filters 149 for one embodiment of the invention are designed to cover a spectral range of 8 to 12 microns which is the region where the atmosphere is transparent to infra-red radiation. There are no significant absorbance bonds from water vapor or carbon dioxide or any other atmospheric component in this spectral range. The individual filters have a band width of one-half to one micron.

It is important that the stray energy passed by the filter outside the band pass must amount to only a very small fraction of the real energy passed by the filter within the band pass. For example, the ratio should be as small as 1:500 for good photometric accuracy. Approximately 90 percent of the energy in the beam is found in the range from 2 to 7 microns, whereas approximately 3 percent is found in the range of 12 to 25 microns. In one embodiment of the invention which operates in the range from 7 – 12 microns, the narrowest filter transmitted 0.2 percent of the energy in the beam. The locking factor N for the 2–7 micron range must, in order to produce the 1:500 ratio between the stray and real energy, be as high as:

$$N = 500 \times 90\% : 0.2\% = 220,000$$

The blocking is produced both by the filter and the blocker. If they have equal blocking factor M:

$M^2 + N$ $M = 470 \approx T <$ than 0.2 percent

Both the filter and the blocker meet this requirement in the 2 – 7 micron region. The blocking requirements for the 12 – 25 micron region are not nearly as severe because the energy in that region is much lower. A barium fluoride disc serves as the filter 126 and cuts off all the energy above 16 microns to obtain adequate blocking.

In further describing the operation of the spectrophotometer and method of the present invention, it is appropriate to consider the optical, mechanical and electronic properties of the spectrophotometer.

With respect to the optical properties, the source 53 supplies infra-red energy. The concave mirror 92 forms the energy into a beam and images the source onto an image limiting aperture 166 magnified approximately two times. Before reaching the image limiting aperture, the infra-red beam passes through the rotating chopper 63 which breaks it at a suitable rate as, for example, 13 cycles per second. It then passes through the blocking filter 124 and a selected filter 149 which passes only a narrow spectral band of energy in the beam.

The infra-red beam emerges from the image limiting aperture 166 monochromatic (within the limits of the filter), chopped and with a divergence corresponding to an $f$ number of approximately 3.5. The size of the image limiting aperture is adjusted to pass the amount of energy which gives the best performance of the detector 204.

The infra-red beam after passing from the limiting aperture 166 strikes a small, flat folding mirror 181 which is placed close to the image limiting aperture 166 and then strikes a collimating mirror 189 which directs the beam through the test piece 48 at a tilt or angle ranging from approximately 4° to 10°. As the beam traverses or passes through the test piece 48, the 4° tilt or greater of the beam ensures that the reflected rays deviate 8° or more from the incoming rays which is enough to remove the reflected rays out of the optical path. It is an important feature of the present invention that substantially all backward reflected light be lost and not become intermingled with the forward transmitted energy. By way of example, the backward reflected energy amounts to 53 percent of the incoming energy with uncoated germanium. It is necessary to rather completely prevent these reflected rays from getting back into the optical path by reflection off the sides of the housing and the like in order to avoid erroneously high transmission readings. The baffle 201 serves to facilitate this objective.

In making the measurements, the test piece should have flat parallel sides with a smooth surface before its transmittance can be accurately measured.

Placing the test beam in the beam will cause the beam offset and change in beam divergence because of tilting of the beam with respect to the test piece and thickness of the test piece. This can be compensated for by adjusting the detector position in accordance with the following formula:

$$x = T\ (n-1/n)$$

where $x$ is the adjustment of the position of the detector with respect to the test piece in a direction perpendicular to the test piece;

T is the thickness of the test piece; and $n$ is the index of refraction of the test piece.

Thus, where the test piece is germanium having an index of refraction of 4 and having a thickness of two inches, $x = 2(4 - 1/4) = 1\frac{1}{2}$ inches.

Similarly, where thickness is ⅝ inch, $x = 0.625\ (4-1/4) = 0.468$ inches.

The infra-red energy passing through the test piece 48 is collected on the other side of the test piece 48 by a collecting mirror 261 which focuses the energy onto the thermocouple detector 204.

The collecting mirror and the detector are mounted in a detector housing which can travel in a vertical direction. The vertical motion of the detector housing, at the same angle, i.e., 4°–10° to the optical path, assures that fully equivalent optical paths are established first without and then with the test piece 48 in the beam. It should be appreciated that it would not be necessary to adjust the detector position vertically if the beam were perfectly collimated and the energy completely evenly distributed in the beam. Since the beam will be deficient in both these respects, it is desirable to compensate for these defects by adjusting the detector position. As pointed out above, the required travel of the detector housing will depend only on the thickness and index of refraction of the test piece.

By way of example, each surface on germanium, if it is uncoated, reflects 36 percent of the energy. Thus, 36 percent of the energy is lost at the first interface. Of the remaining energy which passes through the germanium, 36 percent is reflected back and the remainder goes on to the detector. Of the 36 percent which is reflected by the second interface, 36 percent of this will be reflected forward again with some attenuation. Because of the angle of tilt, the multiple reflectances are displaced from the primary ones. The beam is formed to overfill with a uniform beam the mirror 261. It is important to place the limiting aperture in such a way that the multiple reflectances which are displaced are replaced by multiple reflectances which would otherwise have missed the limiting aperture on the other side.

Thus, it can be seen what is lost on one side because of displacement is compensated for by what is replaced on the other side. Thus, if the beam is uniform, what is lost is equal to that which is gained and the spectrophotometer will still maintain its accuracy. In other words, since the aperture is overfilled, energy removed from one side is replaced with energy from the other side.

It is apparent from the foregoing that there has been provided a new and improved spectrophotometer and method which can be utilized for measuring transmittance in thick windows and in particular thick germanium windows with a high degree of reliability.

I claim:

1. In a spectrophotometer for testing optical transmission properties of a relatively thick test piece, a housing, a source of energy disposed on the housing, means forming an image limiting aperture in the housing, optical means within the housing for receiving energy from the source and forming a beam of the energy and for forming an image of the source in the aperture, detector means and optical means for receiving energy passing through the aperture, and for supplying energy to the detector, said last named optical means including means for collimating the energy in the beam prior to the time that it passes through the test piece and also including means for causing the beam to be tilted with respect to the test piece by a sufficient angle so that substantially all energy which is reflected by the test piece is at an angle so that such reflected energy is out of the optical path and will not have any significant effect on the amount of energy from the beam which passes through the test piece.

2. A spectrophotometer as in claim 1 together with filter means disposed in the beam for passing only selected relatively narrow spectral bands of energy in the beam.

3. A spectrophotometer as in claim 2 wherein said filter means comprises a plurality of separate filters, with each of the filters passing only a relatively narrow spectral band of energy the beam and means for selectively positioning each of said filters in said beam.

4. A spectrophotometer as in claim 1 together with means for chopping the beam at a predetermined frequency, and means for demodulating the output from the detector means.

5. A spectrophotometer as in claim 4 together with means operated in conjunction with said means for selecting one of said filters for inserting a selected value of resistance in said output.

6. A spectrophotometer as in claim 5 wherein said resistance means includes coarse and fine trimming potentiometers for each of said filters.

7. A spectrophotometer as in claim 4 together with a reference source of energy, means for chopping said reference source of energy at a frequency which is proportional to the frequency that said beam is chopped, and means for detecting energy from said reference source after it has been chopped, and wherein said means for demodulating the output includes means for phase sensitive demodulating said output using the detected energy from said reference source as a reference 8. A spectrophotometer as in claim 1 which is adapted to measure test pieces of various thicknesses, and means for adjusting the position of the detector means to make it possible to provide equivalent optical paths through air for the beam with and without the test piece in the beam.

9. A spectrophotometer as in claim 1 wherein said housing is provided with an opening to permit said beam to pass therethrough together with a carriage mounted on said housing adapted to carry said test piece for moving said test piece into and out of said beam.

10. A spectrophotometer as in claim 9 together with means mounted on said housing for moving said carriage between said two positions.

11. A spectrophotometer as in claim 1 together with beam blocking means mounted in said housing and having a blocking filter movable into said beam.

12. A spectrophotometer as in claim 11 wherein said blocking filter is inclined at an angle to the axis for said beam so that energy reflected by the blocking filter is directed out of the beam.

13. A spectrophotometer as in claim 12 wherein said blocking filter has approximately 2 – 7 micron range.

14. A spectrophotometer as in claim 1 in which a limiting aperture is carried by the housing which has a size which is less than the cross-sectional area of the beam so that the aperture is over-filled by the beam.

15. A spectrophotometer as in claim 14 wherein said beam is formed so that the energy of said beam is substantially uniform over the cross-sectional area of the beam.

16. A spectrophotometer as in claim 1 wherein said first named optical means includes an optical element having a concave surface for forming the beam.

17. A spectrophotometer as in claim 16 wherein said second named optical means for receiving energy after it has passed through the aperture includes an optical element providing a concave surface for forming a collimated beam and another optical element for receiving the collimated beam for collecting the energy from the beam and focusing the same on the detector.

18. A spectrophotometer as in claim 17 wherein said optical collecting means is smaller than the cross-sectional area of the collimated beam to thereby form said limiting aperture.

19. A spectrophotometer as in claim 1 wherein said means forming an image limiting aperture includes means for adjusting the size of the aperture.

20. In a method for measuring the transmission of thick test pieces, introducing a collimated beam of energy through said test piece tilted at an angle with respect to said test piece so that energy reflected by the test piece will be thrown out of the optical path of the beam passing through the test piece, measuring the energy in the beam with the test piece out of the beam to provide a reference measurement, and thereafter measuring the energy of the beam passing through the test piece to determine the transmission of energy through the test piece.

21. A method as in claim 20 wherein said first and second measurements are made through optically equivalent air paths.

22. A method as in claim 20 wherein said first and second measurements are made utilizing one at a time of a plurality of relatively narrow spectral bands of energy from the beam.

23. A method as in claim 20 together with the step of forming the energy from the source into a beam and forming an image of the source in an aperture.

24. A method as in claim 20 together with the step of chopping the beam and detecting the measured information.

25. A method as in claim 20 wherein said beam is tilted with respect to the test piece at an angle ranging from 4° to 10°.

26. A method as in claim 24 together with the step of forming a chopped reference signal which is chopped at the same frequency as the beam, utilizing said chopped reference signal to phase sensitive demodulate the detected information.

27. A method as in claim 26 together with the step of compensating the detecting output in accordance with the spectral region.

* * * * *